(12) United States Patent
Nilsson

(10) Patent No.: US 6,357,395 B1
(45) Date of Patent: Mar. 19, 2002

(54) ANIMAL STALL AND METHOD INCLUDING A GATE SENSOR MEANS

(75) Inventor: Mats Nilsson, Tumba (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 09/554,412

(22) PCT Filed: Nov. 9, 1998

(86) PCT No.: PCT/SE98/02016
§ 371 Date: Jun. 2, 2000
§ 102(e) Date: Jun. 2, 2000

(87) PCT Pub. No.: WO99/25180
PCT Pub. Date: May 27, 1999

(30) Foreign Application Priority Data

Nov. 14, 1997 (SE) .............................................. 9704175

(51) Int. Cl.[7] .................................................. A01K 1/00
(52) U.S. Cl. ...................................................... 119/524
(58) Field of Search ........................... 119/14.03, 51.02, 119/520, 518, 519, 524, 14.14, 840

(56) References Cited

U.S. PATENT DOCUMENTS

| | | | |
|---|---|---|---|
| 3,792,686 A | * 2/1974 | Needhan et al. | ......... 119/14.03 |
| 4,763,605 A | * 8/1988 | Braum | ..................... 119/14.03 |
| 5,439,808 A | * 8/1995 | Street et al. | ................... 119/27 |
| 5,628,284 A | 5/1997 | Sheen et al. | |
| 5,704,311 A | 1/1998 | van den Berg | |
| 5,950,562 A | * 9/1999 | Schulte et al. | ........... 119/51.02 |

FOREIGN PATENT DOCUMENTS

| | | |
|---|---|---|
| JP | 6-225657 | 8/1994 |
| JP | 6-343363 A | 12/1994 |
| NL | 9000845 A | 11/1991 |
| WO | WO 9737528 A1 | 10/1997 |
| WO | WO 9804120 A1 | 2/1998 |

* cited by examiner

Primary Examiner—Peter M. Poon
Assistant Examiner—Kevin Jakel
(74) Attorney, Agent, or Firm—Weingarten, Schurgin, Gagnebin & Lebovici LLP

(57) ABSTRACT

An animal stall (1) associated with an apparatus for performing an animal related operation, said stall being provided with an entrance gate (7) and an exit gate (8). A method of performing said animal related operation is also described. According to the invention, a gate sensor means (12), associated with a control means, is furthermore associated with at least said entrance gate for checking whether said gate (7) is closed.

27 Claims, 2 Drawing Sheets

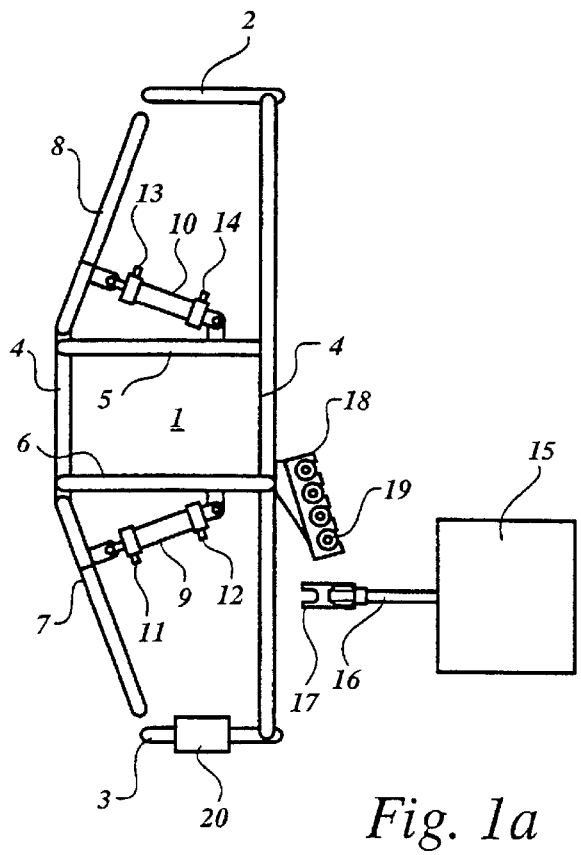
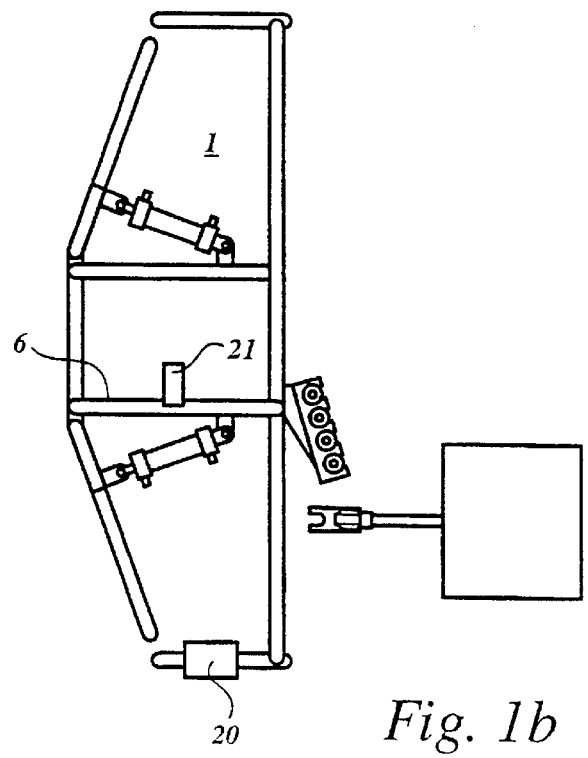
Fig. 1a
Fig. 1b

ANIMAL STALL AND METHOD INCLUDING A GATE SENSOR MEANS

TECHNICAL FIELD OF THE INVENTION

The present invention relates to an animal stall associated with an apparatus for performing an animal related operation, said stall being provided with an entrance gate and an exit gate. It also relates to a method of performing an animal related operation in such an animal stall.

An apparatus and a method of this kind is disclosed in EP-A-0 451 906.

BACKGROUND OF THE INVENTION

In order to efficiently perform milking of an animal it is common to keep the animal in a milking stall. Such milking stalls are accordingly used not only for manual milking (manual attachment and detachment of teatcups) or semi-automatic milking (manual attachment and automatic detachment of teatcups), but also for automatic milking (automatic attachment and detachment of teatcups).

Different kinds of milking stalls for forcing an animal into a desired position in the milking stall have been suggested. One of them is the above cited EP-A-0 451 906, in which it is suggested to utilise the entrance gate of the stall to force a cow into a desired position and to maintain i.a. the gate in contact with the cow for maintaining her in said position. To this end, a locking device for the gate is provided. After performed positioning of the cow, teatcups are attached to her teats by means of a milking robot arm.

However, in case force is used on a cow (or any milking animal) while it enters the milking stall, she may be reluctant to enter the stall the following times she is to be milked, which may cause that the milking robot is not utilised as much as it could be. Force used on the cow may also affect the milk yield, as a cow under stress may not produce as much milk as it would, in case it felt comfortable.

It is thus the object of the invention to obtain an animal stall, that overcomes these and other disadvantages.

SUMMARY OF THE INVENTION

This has been solved by an animal stall of the initially defined kind, which is characterised in that a gate sensor means, associated with a control means, is furthermore associated with at least said entrance gate for checking whether said gate is closed.

It has also been solved by a method of the initially defined kind, which is characterised by checking by means of a gate sensor means, associated with a control means, whether at least said entrance gate is closed, said control means being associated with said gate.

Hereby is achieved a possibility to check whether the animal has correctly entered the stall, i.e. that it has not become clamped by the entrance gate. Furthermore, it is possible to check that the gate is working in a normal way.

Suitably, said control means is adapted to control a driving means adapted to perform either of an opening movement and a closing movement. Hereby, it is possible to open and close the gate as desired.

In case the gate has not been closed within a predetermined period of time, it may be assumed that the cow has become clamped by the entrance gate. Accordingly, a first timer means is adapted to measure a period of time from a defined starting point, and wherein in case said sensor means has not sensed that said gate is closed within a predetermined period of time, said driving means is controlled by said control means to perform an opening movement of said gate. Hereby, the animal is let loose again, so that it can either enter the stall properly, or leave the stall.

Preferably, said starting point is the point in time when the control means starts controlling said driving means to perform a closing movement. Furthermore, an animal presence sensor means associated with the control means is provided to for sense the presence of an animal in the animal stall. Furthermore, said animal presence sensor is associated with a second timer means for measuring the time lapsed from when the presence of an animal has been sensed, said second timer means being adapted to generate a signal to said control means after a predetermined period of time, said control means being adapted to control said driving means to perform said closing movement in response to said signal from said timing means. Hereby, simple starting indications are given to the control means.

Suitably, said animal presence sensor comprises one of a photo cell, a laser sensor and an ultrasonic sensor.

Preferably, said animal related means is adapted to perform said animal related operation in response to said control means in case said entrance gate is closed. Hereby, a starting signal for the animal related operation is given.

An animal may however stay in the position where it gets clamped e.g. because of illness. There is accordingly a need for ending the repetition of the closing movement. Thus, said control means is adapted to keep said gate open in case it has not been possible to close it properly after a predetermined period of time. Alternatively, or additionally, said control means is adapted to keep said gate open in case it has not been possible to close it properly after a predetermined number of attempts.

Suitably, said animal related means is provided with a robot arm for performing said animal related operation, said robot arm being associated with said control means.

Preferably, said robot arm is provided with a manipulating means for gripping an animal related member.

Suitably, said animal related member is one of a teatcup and a teat cleaning unit.

Preferably said gate sensor means comprises a tactile sensing unit.

Suitably, said tactile sensing unit comprises a toggle switch.

Preferably, said gate sensor means comprises a non-tactile sensing unit.

Suitably, said non-tactile sensing unit comprises one of an inductive sensor, a capacity sensor and a laser sensor.

DRAWING SUMMARY

The invention will now be described in more detail with reference to the accompanying drawings, in which:

FIGS. 1a and 1b illustrate an animal stall,

DETAILED DESCRIPTION

Figure 2:
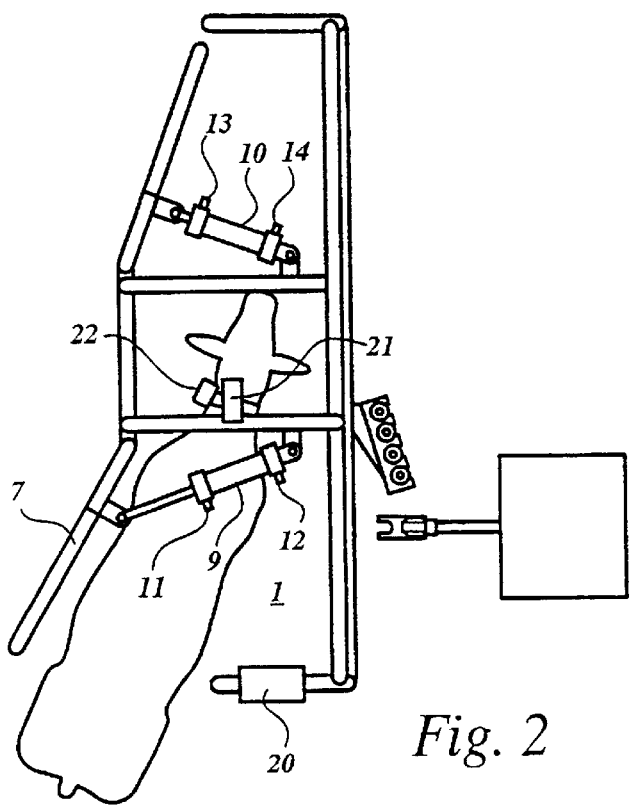
FIG. 2 illustrates a cow entering the animal stall shown in FIG. 1b.

FIG. 1a shows a milking stall 1, comprising front, rear and side delimitations 2, 3 4, in the form of e.g bars. It further comprises a pair of overhead beams 5, 6 an entrance gate 7 and an exit gate 8. A driving means 9, interconnects the overhead beam 6 and the stall gate. Furthermore, a driving means 10 interconnects the overhead beam 5 with the exit gate 8. The driving means 9 and 10 may be in the form of a pneumatic or hydraulic cylinder or an electric motor. The movement of the driving means 9 and 10, respectively, is controlled by a control means (not shown).

The driving means 9, 10 are each provided with end stop sensors 11, 12, 13 and 14, for generating a signal whether the driving means is in a retracted state (sensors and 12, 14), or in an extended state (sensors 11 and 13), and transmit said signal to a control means (not shown). In FIG. 2, the cylinder 9 is shown in an extended state, whereas the cylinder 10 is shown in a retracted state.

FIG. 1a furthermore shows an apparatus 15 for performing an animal related operation, such as milking. To this end, a robot arm 16 with a gripper 17 and a teatcup rack 18 with teatcups 19 are provided.

A transponder reader 20 is provided for identification purposes (see below).

FIG. 1b illustrates the same stall as in FIG. 1a, but including an animal presence sensor 21, in the form of a photo cell, a laser sensor or an ultrasonic sensor, arranged on the overhead beam 6. The sensor 21 is directed towards the floor of the stall and will generate a signal to be transmitted to a control means (not shown), when a part of an animal is underneath the sensor 21.

FIG. 2 shows a cow on its way to enter the animal stall 1. The entrance gate 7 is open, which is indicated by the sensor 11 of the cylinder 9. The exit gate is closed, which is indicated by the sensor 14 of the cylinder 10.

The cow's head is underneath the animal sensor. Accordingly, the presence of the cow in the animal stall is now indicated by the sensor 21.

The cow is provided with a tansponder 22, which interacts with the transponder reader 20 connected to a control means (not shown). The control means determines whether the cow is allowed to enter the animal stall 1.

Figure 3:
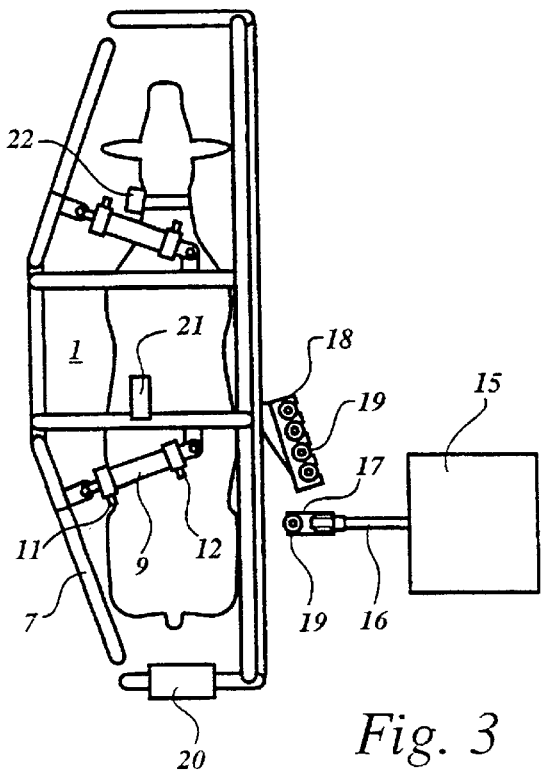
FIG. 3 illustrates a cow that has fully entered the animal stall shown in FIG. 1b.

In FIG. 3, the cow has completely entered the animal stall 1. The entrance gate 7 is closed, which is indicated by the sensor 12 of the cylinder 9.

Operation

An animal standing close to an animal stall 1 and wearing a transponder 22, will be identified by the transponder reader 20. In case the animal is allowed to enter the stall 1, the gate 7 is opened by operation of the cylinder 9. The sensor 11 indicates when the gate is fully opened.

In the embodiment shown in FIG. 1a, the indication of sensor 11 is the starting signal for when to start closing the gate 7. Accordingly, after a predetermined period of time, which is measured by means of a timer—not shown, but preferably included in the control means—and may be e.g. 10 seconds, the cylinder 9 starts closing the gate 7 in response to a starting signal from the control means.

In the embodiment according to FIG. 1b, the gate will be opened in case an identified animal is allowed to enter it. The sensor 11 may be used, as an indication of its function, to indicate when the gate is fully opened, but is not needed as a starting indicator.

Instead, the sensor 21 senses the presence of an animal in the stall. If the sensor 21 senses only intermittently that something, like an animal, is present, no indication is given. However, if the sensor continuously senses the presence of e.g. an animal in the stall for a predetermined time period, e.g. 4 seconds. the cylinder 9 is controlled to start closing the gate 7. If, during closing of the gate, the sensor senses that no animal is present in the stall the gate is controlled to immediately re-open the gate.

In the following, subsequent sequences will be described, which relate to the embodiment according to FIG. 1a as well as to the embodiment according to FIG. 1b.

When the starting signal is sent to the cylinder 9, the timer is started again. If the sensor 12 does not sense, within a predetermined period of time, e.g. 5 seconds, that the gate is closed, there is a risk that the animal (or a person) has become clamped by the gate 7; or the gate 7 and/or the cylinder 9 and/or the sensors are not working properly; or the control means is out of order.

The gate 7 is opened again so that the animal is allowed to either move away from the animal stall or to fully enter it.

After a predetermined period of time, the closing sequence of the gate 7 is started again. If closing of the gate does not succeed, the gate is opened again.

If closing of the gate has not succeeded after e.g. three attempts, the gate 7 is kept completely open. In addition, a signal may be sent by the control means to a buzzer or the like worn by the dairy maid to immediately visit the animal stall.

However, if the sensor 12 does sense, within the predetermined period of time, that the gate 7 is closed, an animal related operation is allowed to be started. The animal related operation may be performed by the robot 15 and includes performance of e.g. milking by means of a milldng unit, cleaning of the teats by means of a teat cleaning unit, or grooming by means of a brush.

It should be noted that the automatic opening and closing of a the entrance gate is adaptable to the exit gate after performed animal related operation, or if the cow should be let out of the animals stall for any other reason.

It should also be noted that the sensor 21 may be a tactile sensor, e.g. a pressure sensitive sensor in the floor.

Furthermore, the indication that the gate is closed may be performed by sensing the position of the gate by means of a tactile sensor, such as a toggle switch, or by a non-tactile sensor, such as an inductive sensor, a capacitive sensor or a laser sensor.

Instead of the overhead beams 5 and 6, a single beam may be arranged to connect the side limitations 4 with one another. In that case, the sensor 21 should of course be arranged on that single beam.

Wherever a cow has been mentioned, it should be understood that the invention also relates to other milking animals, such as sheep, goats, buffaloes and horses.

What is claimed is:

1. An animal stall associated with an animal related apparatus for performing an animal related operation, said stall being provided with an entrance gate, an exit gate, a driving gate and a gate sensor means, said gate sensor means being associated with a control means, and with at least said entrance gate for checking the position of said gate, characterised in that a first timer means is adapted to measure a period of time from a defined starting time, and that in dependence of if said sensor means has not detected that said gate is closed within said period of time, said driving means perform an opening movement of said gate.

2. An animal stall according to claim 1, wherein said starting time is when the control means starts controlling said driving means to perform a closing movement.

3. An animal stall according to claim 2, wherein:

an animal presence sensor means associated with the control means is provided to sense the presence of an animal in the animal stall;

said animal presence sensor is associated with a second timer means for measuring the time lapsed from when the presence of an animal has been sensed, said second timer means being adapted to generate a signal to said control means after a predetermined period of time, said control means being adapted to control said driving means to perform said closing movement in response to said signal from said timing means;

said animal presence sensor comprises one of a photo cell, a laser sensor and an ultrasonic sensor;

said animal related apparatus is adapted to perform said animal related operation in response to said control means in case said entrance gate is closed;

said control means is adapted to keep said gate open in case it has not been possible to close it properly after a predetermined period of time;

said control means is adapted to keep said gate open in case it has not been possible to close it properly after a predetermined number of attempts;

said animal related means is provided with a robot arm for performing said animal related operation, said robot arm being associated with said control means;

said robot arm is provided with a manipulating means for gripping an animal related member;

said animal related member is one of a teatcup and a teat cleaning unit;

said gate sensor means comprises one of a toggle switch, an inductive sensor, a capacity sensor and a laser sensor.

4. An animal stall according to claim 1, wherein an animal presence sensor means associated with the control means is provided to sense the presence of an animal in the animal stall.

5. An animal stall according to claim 4, wherein said animal presence sensor is associated with a second timer means for measuring the time lapsed from when the presence of an animal has been sensed, said second timer means being adapted to generate a signal to said control means after a predetermined period of time, said control means being adapted to control said driving means to perform said closing movement in response to said signal from said second timing means.

6. An animal stall according to claim 5, wherein said animal presence sensor comprises one of a photo cell, a laser sensor and an ultrasonic sensor.

7. An animal stall according to claim 1, wherein said animal related apparatus is adapted to perform said animal related operation in response to said control means in case said entrance gate is closed.

8. An animal stall according to claim 1, wherein said control means is adapted to keep said gate open in case it has not been possible to close it properly after a predetermined period of time.

9. An animal stall according to claim 1, wherein said control means is adapted to keep said gate open in case it has not been possible to close it properly after a predetermined number of attempts.

10. An animal stall according to claim 1, wherein said animal related means is provided with a robot arm for performing said animal related operation, said robot arm being associated with said control means.

11. An animal stall according to claim 10, wherein said robot arm is provided with a manipulating means for gripping an animal related member.

12. An animal stall according to claim 11, wherein said animal related member is one of a teatcup and a teat cleaning unit.

13. An animal stall according to claim 1, wherein said gate sensor means comprises a tactile sensing unit.

14. An animal stall according to claim 13, wherein said tactile sensing unit comprises a toggle switch.

15. An animal stall according to claim 1, wherein said gate sensor means comprises a non-tactile sensing unit.

16. An animal stall according to claim 15, wherein said non-tactile sensing unit comprises one of an inductive sensor, a capacity sensor and a laser sensor.

17. A method of performing an animal related operation in an animal stall associated with an animal related apparatus, said stall being provided with an entrance gate, an exit gate and a gate sensor means associated with a control means for checking the position of at least said entrance gate, said control means being associated with said gate. characterised by defining a starting time;

measuring the time lapsed after said starting time by means of a first timer means;

controlling said driving means to perform an opening movement of said gate in case a predetermined period of time has lapsed and said gate sensor means has not sensed that said gate is closed.

18. A method according to claim 17, including defining said starting time as being when the control means starts controlling said driving means to perform a closing movement.

19. A method according to claim 18, including:

sensing the presence of an animal in the animal stall by means of an animal presence sensor means associated with the control means;

measuring the time lapsed from when the presence of an animal has been sensed by means of a second timer means;

generating a signal to said control means after a predetermined period of time;

controlling said driving means to perform said closing movement in response to said signal from said second timing means;

performing said animal related operation in case said entrance gate is closed;

performing said animal related operation by means of a robot arm provided with a manipulating means;

attaching a teatcup onto a teat of an animal present in the animal stall for performing milking;

cleaning at least one teat of an animal present in the animal stall; and wherein said control means is adapted to keep said gate open in case it has not been possible to close it properly after a predetermined period of time; and said control means is adapted to keep said gate open in case it has not been possible to close it properly after a predetermined number of attempts.

20. A method according to claim 17, including sensing the presence of an animal in the animal stall by means of an animal presence sensor means associated with the control means.

21. A method according to claim 2, including:

measuring the time lapsed from a when the presence of an animal has been sensed by means of a second timer means;

generating a signal to said control means after a predetermined period of time;

controlling said driving means to perform said closing movement in response to said signal from said timing means.

22. A method according to claim 21, including performing said animal related operation in case said entrance gate is closed.

23. A method according to anyone of claim 17, including performing said animal related operation by means of a robot arm provided with a manipulating means.

24. A method according to anyone of claim 17, including attaching a teatcup onto a teat of an animal present in the animal stall for performing milking.

25. A method according to anyone of claim 17, including cleaning at least one teat of an animal present in the animal stall.

26. A method according to anyone of claim 17, wherein said control means is adapted to keep said gate open in case it has not been possible to close it properly after a predetermined period of time.

27. A method according to anyone of claim 17, wherein said control means is adapted to keep said gate open in case it has not been possible to close it properly after a predetermined number of attempts.

* * * * *

UNITED STATES PATENT AND TRADEMARK OFFICE
CERTIFICATE OF CORRECTION

PATENT NO. : 6,357,395 B1
DATED : March 19, 2002
INVENTOR(S) : Mats Nilsson

It is certified that error appears in the above-identified patent and that said Letters Patent is hereby corrected as shown below:

Column 4,
Line 28, "milldng" should read -- milking --;
Line 53, "driving gate" should read -- driving means --;

Column 6,
Line 11, "exit gate and" should read -- exit gate, a driving means, --;
Line 56, "2" should read -- 20 --;
Line 57, "from a when" should read -- from when --;
Line 68, delete "anyone of";

Column 7,
Lines 1, 4 and 7, delete "anyone of"; and

Column 8,
Line 3, delete "anyone of".

Signed and Sealed this

Thirteenth Day of May, 2003

JAMES E. ROGAN
*Director of the United States Patent and Trademark Office*